United States Patent [19]

Hemmerich et al.

[11] 4,244,863

[45] Jan. 13, 1981

[54] PREPARATION OF PIGMENT CONCENTRATES

[75] Inventors: Heinz Hemmerich, Krefeld-Bockum; Jürgen Spille, Bergisch-Gladbach; Dietmar Kranz, Cologne; Peter Rasche, Aachen; Hans J. Rosenkranz, Krefeld, all of Fed. Rep. of Germany

[73] Assignee: Bayer Aktiengesellschaft, Leverkusen, Fed. Rep. of Germany

[21] Appl. No.: 936,063

[22] Filed: Aug. 23, 1978

[30] Foreign Application Priority Data

Aug. 26, 1977 [DE] Fed. Rep. of Germany ....... 2738511

[51] Int. Cl.$^3$ ............................................. C08J 3/20
[52] U.S. Cl. ................................. 260/42.55; 260/34.2; 260/42.47; 260/42.52; 260/42.56; 260/42.57
[58] Field of Search ........... 260/42.55, 34.2, 29.6 AT, 260/42.56, 42.57

[56] References Cited

U.S. PATENT DOCUMENTS

| | | | |
|---|---|---|---|
| 3,108,984 | 10/1963 | Romesberg et al. | 260/34.2 |
| 3,689,451 | 9/1972 | Burke, Jr. | 260/42.55 |
| 3,700,620 | 10/1972 | Burke, Jr. | 260/42.55 |
| 3,978,016 | 8/1976 | Perronin et al. | 260/42.55 |
| 4,104,229 | 8/1978 | Sekmakas et al. | 260/42.55 |

FOREIGN PATENT DOCUMENTS 917326 2/1963 United Kingdom .
1263943 2/1972 United Kingdom .

*Primary Examiner*—Lewis T. Jacobs

[57] ABSTRACT

The application relates to a process for the preparation of pigment concentrates, preferably pulverulent pigment concentrates, which is characterized in that the polymer present in an intimate mixture, free from non-ionic surface-active agents, of an aqueous pigment suspension and an aqueous latex of a polymer or polycondensate containing carboxyl groups, or an aqueous solution of a polymer or polycondensate containing carboxyl groups, is coagulated by adding an electrolyte, while thoroughly mixing intensively, and the coagulate containing the pigment is then separated off in a known manner and optionally dried.

The pigment concentrates are suitable for pigmenting aqueous media and printing pastes for pigment printing of textiles.

2 Claims, No Drawings

PREPARATION OF PIGMENT CONCENTRATES

The invention relates to a process for the preparation of pigment concentrates which are suitable for pigmenting aqueous media, for example aqueous printing inks, wallpaper paints, emulsion paints and printing pastes for pigment printing on textiles.

Liquid to paste-like pigment formulations in predominantly non-ionic surface-active agents have, above all, found wide use for pigmenting aqueous media for application. However, the disadvantage is that the high content of surface-active agents which remain in the medium can lead to incompatabilities with other components of the medium and thus cause flocculation, decrease in the depth of colour, thickening and sedimentation.

Pulverulent pigment formulations containing a proportion of up to about 60% of a solid anionic surface-active agent are also commercially available. However, in practice this high content of anionic surface-active agents leads to many problems, such as swelling of the film in the presence of moisture, insufficient resistance to washing and inadequate fastness to weathering.

Furthermore, it is known to prepare dry, water-dispersible pigment formulations by homogenising aqueous mixtures of the pigment, non-ionic surface-active agents, non-ionic polymers and optionally non-ionic colloids and then removing the water by evaporation and subsequent grinding at low temperatures, or preferably by spray-drying (DT-OS (German Published Specification) No. 2,608,993).

It is also known to prepare pigment formulations by mixing an aqueous pigment dispersion with at least one non-ionic surface-active agent, then precipitating an insoluble complex of the non-ionic surface-active agent and a polymeric carboxylic acid onto the pigment by adding a polymeric carboxylic acid, preferably polyacrylic acid or polymethacrylic acid, and lowering the pH value to 4 or below, and then separating off the pigment formulation (DT-OS (German Published Specification) No. 2,547,539).

Furthermore, dyestuff formulations which are particularly suitable for pigmenting aqueous media and contain, in addition to 20 to 90% of pigment, styrene/maleic anhydride copolymers have been disclosed, which are prepared by subjecting the components to dry grinding together or by grinding in the presence of water-insoluble or, more advantageously, water-soluble organic solvents using ball mills, roll mills or bead mills, but preferably by kneading the pigment and copolymer, preferably in the presence of a grinding auxiliary, such as sodium chloride. If the copolymers here contain free carboxyl groups, the pigment formulations have a considerably poorer dispersibility in an aqueous medium and lead to less stable dispersions (DT-OS (German Published Specification) No. 2,027,537).

It has now been found, surprisingly, that pigment formulations with a good dispersibility in aqueous media can be prepared by a process in which the polymer present in an intimate mixture, free from non-ionic surface-active agents, of an aqueous pigment suspension and an aqueous latex of a polymer or polycondensate containing carboxyl groups, or an aqueous solution of a polymer or polycondensate containing carboxyl groups, is coagulated by adding an electrolyte, whilst thoroughly mixing intensively, and the coagulate containing the pigment is then separated off in a known manner.

The process according to the invention avoids expensive process steps, such as spray-drying aqueous pigment mixtures, grinding in the presence of organic solvents or kneading at high temperatures and gives pigment formulations which are free from anionic surface-active agents.

The water-moist coagulates obtained by the process according to the invention are employed such as or, after drying and optionally grinding, as pulverulent pigment concentrates. It can be appropriate here to add up to 15% by weight, preferably 2 to 10% by weight, of non-ionic surface-active agents.

Suitable pigments are inorganic pigments, such as titanium dioxide, chromium oxides and iron oxides, cadmium pigments based on the sulphide and sulphide/selenide, mixed phase pigments of the rutile or spinel type and carbon black pigments, as well as organic pigments of all known classes of pigments, for example copper phthalocyanine pigments, quinacridone pigments, diaryl yellow pigments, dioxazine pigments, anthanthrone pigments, thioindigo pigments, naphthalenetetracarboxylic acid pigments, perylenetetracarboxylic acid pigments and azo pigments of the monoazo and disazo series, in particular those with acetoacetic acid arylamides, $\beta$-hydroxynaphthoic acid arylamides or laked $\beta$-hydroxynaphthoic acids as coupling components.

Suitable polymers and polycondensates containing carboxyl groups are polymers which are soluble in aqueous-alkaline media, if appropriate with the aid of organic solvents, and insoluble in aqueous-acid media or in aqueous media containing polyvalent cations or in aqueous-acid media containing polyvalent cations, and which can be prepared by vinyl polymerisation or by polycondensation and contain carboxyl and/or carboxylate groups in the molecule.

In the case of the polymers according to the invention which can be prepared by vinyl polymerisation, the carboxyl groups are introduced by incorporating appropriate vinyl monomers, for example by incorporating unsaturated monocarboxylic acids, such as acrylic acid, methacrylic acid and crotonic acid, or by incorporating unsaturated polycarboxylic acids, such as maleic acid, fumaric acid and itaconic acid, or the corresponding anhydrides and half-esters. Acrylic acid, methacrylic acid and maleic anhydride are preferred. Preferred polymers are copolymers with other vinyl monomers which carry no carboxyl groups. Examples which may be mentioned are dienes, such as buta-1,3-diene and 2-methylbuta-1,3-diene, styrene, α-methylstyrene, acrylates and methacrylates, such as methyl acrylate and methacrylate, ethyl acrylate and methacrylate and butyl acrylate and methacrylate, acrylamide, methacrylamide, acrylonitrile, methacrylonitrile, vinyl esters, such as vinyl acetate and vinyl propionate, and vinyl ethers, such as methyl vinyl ether, ethyl vinyl ether and isobutyl vinyl ether.

Such copolymers are obtainable by customary vinyl copolymerisation reactions, that is to say in one stage. However, multi-stage preparation processes are also possible, for example polymerisation of butadiene to give a low-molecular polybutadiene, and subsequent addition of maleic anhydride. Preferred polymers in the sense of the invention are terpolymers of acrylic acid or methacrylic acid, acrylonitrile or styrene and butadiene or at least one acrylate or methacrylate, and copolymers of styrene and maleic anhydride, in which the predominant proportion of the anhydride groups can also be reacted with monoalcohols to give the half-esters.

The terpolymers are preferable to the copolymers.

Polycondensates, according to the invention, containing carboxyl groups are alkyd resins which can be diluted with water, the carboxyl groups of which originate from co-condensed polycarboxylic acids, such as phthalic anhydride and tetrahydrophthalic anhydride, and are neutralised with amines, such as triethylamine. Solvents such as ethylglycol and butanol can also be used for the preparation of aqueous solutions.

The polymers which are suitable according to the invention can be prepared by various methods and are obtained, for example, as latices by emulsion polymerisation, usually using molecular weight regulators, or as aqueous-alkaline solutions by solution polymerisation. Solutions of the polymers can also be obtained by dissolving appropriate latices in aqueous-alkaline media. The polycondensates containing carboxyl groups are usually obtained by a melt condensation reaction or an azeotropic condensation.

The solids content of the latices and polymer solutions employed can vary within wide limits. In general, it is between 10 and 70% by weight in the case of the latices and between 1 and 50% by weight in the case of the polymer solutions. As a rule, the latex particle size is non-uniform and is between about 0.1 and 0.35 $\mu$m. However, dispersions with particle sizes of less than 0.1 $\mu$m can also be employed. The latices, which are obtainable by discontinuous or continuous processes, are prepared either free from emulsifiers or using ionic, especially anionic, emulsifiers. In general, the average molecular weights of suitable polymers are in the range between 1,000 and several millions. The range from about 1,500 up to 500,000 is preferred. The range from about 3,000 to 50,000 is particularly preferred.

The polymers and polycondensates containing carboxyl groups have an acid number of about 40 to 500, preferably 100 to 300.

The thorough intensive mixing in the preparation process according to the invention is effected by means of conventional stirrers or, preferably, with mixing units having an intensive action, for example with mixers operating according to the rotor-stator principle (for example Ultra-Turrax), high-speed stirrers, such as dissolvers and dispersers, sand mills or bead mills.

The aqueous pigment suspensions can be prepared starting from dry powder pigments; however, in general it is more advantageous to employ water-containing pigment pastes or pigment press cakes. The suitable pigment concentrations of these aqueous suspensions can vary within wide limits. Concentrations between 5 and 35% by weight of pigment have proved suitable in practice. If dissolvers are used, it is advantageous to initially choose relatively high pigment concentrations of up to about 60% by weight, to establish pasty consistencies in order to achieve a better mixing effect. In the preparation of the aqueous pigment suspensions, it is also possible to add about 0.1 to 5% by weight, relative to the pigment, of a wetting agent, preferably an anionic emulsifier, which, however, is washed out in carrying out the process according to the invention and does not occur in the finished pigment formulation. The sequence for mixing the aqueous pigment suspension and aqueous polymer dispersion or polymer solution is not critical, but it has proved advantageous to initially introduce the pigment suspensions and to allow the latex or the polymer solution to run in.

Possible electrolytes for the coagulation are inorganic salts and acids. Inorganic salts which are employed are preferably salts with polyvalent cations, such as magnesium chloride, magnesium sulphate, calcium chloride, barium chloride, aluminium chloride, aluminium sulphate, iron-II chloride, cobalt chloride, nickel chloride, copper chloride or zinc chloride. Magnesium sulphate, calcium chloride and aluminium sulphate are particularly preferred. Preferred inorganic acids are hydrochloric acid, nitric acid and sulphuric acid. Coagulation by adding the electrolyte can be carried out in the cold or also at elevated temperature. The range between about 20° and 80° C. has proved particularly appropriate. It is possible to use an aqueous solution of the inorganic salt or also the solid salt.

In general, 0.5 to 10% by weight, relative to the sum of the weights of pigment employed and polymer solid, of inorganic salt are required. If an acid is exclusively or additionally used for the coagulation, it has proved advantageous to adjust the pH value to between 6 and 1.

The solid constituent of the pigment formulations according to the invention in each case consists of pigment to the extent of about 60 to 95% by weight and of polymer to the extent of about 40 to 5% by weight.

Examples of suitable non-ionic surface-active agents which the pulverulent pigment concentrates according to the invention can contain are alkoxylated phenols or naphthols, such as nonylphenol ethoxylates, alkoxylated fatty alcohols, such as lauryl alcohol ethoxylates, alkoxylated fatty acids, such as stearic acid ethoxylates, alkoxylated fatty acid amides, such as oleic acid amide ethoxylates, alkoxylated alkylamines, such as laurylamine ethoxylates, ethoxylated $C_{12}$–$C_{18}$-alkylsulphonic acid amides and block copolymers of ethylene oxide and propylene oxide.

According to the invention, it is also possible to use more than one pigment for the preparation of the aqueous pigment suspension or to mix more than one polymer dispersion or polymer solution with the aqueous pigment suspension. The products can be dried at 10° to 300° C., preferably at 50 to 200° C. It is also possible to spray-dry that aqueous coagulate, optionally without separating it off beforehand.

Compared with the corresponding powder pigments of the starting material, the pigment formulations according to the invention show an improved dispersibility in alkaline, aqueous media. The alkaline media here can be purely aqueous or can additionally contain water-miscible organic solvents, such as ethanol, ethylene glycol and diethylene glycol. The pigment formulations according to the invention are advantageously suitable for pigmenting lacquers, paints and coating agents, for example emulsion paints, which are aqueous or can be diluted with water, for pigmenting aqueous printing inks, for example flexographic printing inks, wallpaper paints and furthermore printing pastes for pigment printing on textiles. Moreover, they are distinguished by the fact that from the point of view of their technological properties they are more closely related to pulverulent pigment formulations, and on the other hand from the point of view of their coloristic properties they are more closely related to pure, non-extended pigments. In addition, in the case of dry formulations, the pigment formulations according to the invention dust less and have better free-flowing properties.

For pigmenting, the products prepared according to the invention are added, individually or in a mixture, to the printing inks, emulsion paints and the like in the particular customary amounts. It is also possible to combine several of the pigment formulations prepared according to the invention or to combine one or more of the pigment formulations prepared according to the invention with at least one organic or inorganic pigment present in the form of a conventional powder pigment or in the form of a pigment formulation.

EXAMPLE 1

Preparation of a polymer latex 100 g of deionised water, 0.4 g of emulsifier (sodium alkylsulphonate, $C_{12}$–$C_{18}$), 0.3 g of potassium peroxydisulphate and 10 g of a monomer mixture consisting of 4.3 g of butyl acrylate, 1.7 g of acrylonitrile and 4.0 g of methacrylic acid were initially introduced into a glass flask provided with a stirrer and reflux condenser. The mixture was heated to 75° C. 15 minutes after this temperature has been reached, 90 g of a monomer mixture consisting of 43% by weight of butyl acrylate, 17% by weight of acrylonitrile and 40% by weight of methacrylic acid, and 190 g of deionised water, in which 0.2 g of the emulsifier and a further 0.3 g of potassium peroxydisulphate were dissolved, were allowed to run in simultaneously in the course of 3 hours. The mixture was then subsequently stirred at 75° C. for a further 5 hours. Finally, the residual monomers which remained were removed by degassing the mixture in vacuo at 40° to 50° C.

A 20% strength aqueous pigment suspension was prepared from 90 g of β-copper phthalocyanine (C.I. Pigment Blue 15, No. 74,160) and 360 g of water by means of an Ultra-Turrax. 40 g of the 25% strength latex described above were then allowed to run in, whilst the mixing unit continued to run. 30 g of a 10% strength aluminium sulphate solution were then added, without switching off the Ultra-Turrax. The coagulate was filtered off, washed thoroughly with warm water and dried at about 50° C. in vacuo. About 100 g of a product were obtained, which consisted of copper phthalocyanine to the extent of 90% by weight and of the terpolymer to the extent of 10% by weight.

EXAMPLE 2

(a) The procedure followed was as described in Example 1, but 80 g of pigment and 80 g of latex were employed, whereupon a product consisting of 80% by weight of copper phthalocyanine and 20% by weight of terpolymer was obtained.

(b) 50 g of this pigment concentrate were ground in an impact mill together with 2.5 g of nonylphenol polyglycol ether. A pulverulent pigment concentrate consisting of about 76% by weight of pigment, about 19% by weight of terpolymer and about 5% by weight of surface-active agent was obtained.

EXAMPLE 3

(a) An aqueous pigment suspension was prepared from 80 g of β-copper phthalocyanine and 360 g of water by means of an Ultra-Turrax. 80 g of the latex from Example 1 were then allowed to run in, whilst the mixing unit continued to run. 30 g of a 10% strength aluminium sulphate solution were then added, without switching off the Ultra-Turrax, and the mixture was adjusted to pH 1 with 10% strength sulphuric acid. The coagulate was filtered off, washed thoroughly with warm water and dried at 50° C. in vacuo. About 100 g of a product consisting of 80% by weight of copper phthalocyanine and 20% by weight of terpolymer were obtained.

(b) 30 g of this pigment concentrate were ground together with 1.5 g of the surface-active agent from Example (2b). A pulverulent pigment concentrate consisting of about 76% by weight of pigment, about 19% by weight of terpolymer and about 5% by weight of surface-active agent was obtained.

(c) A further 30 g of the concentrate from (a) were ground with 3 g of the same surface-active agent to give a pulverulent pigment concentrate consisting of about 73% by weight of pigment, about 18% by weight of terpolymer and about 9% by weight of surface-active agent.

(d) A further 30 g of the concentrate from (a) were ground with 1.5 g of 3-benzyl-4-hydroxybiphenyl polyglycol ether to give a pulverulent pigment concentrate consisting of about 76% by weight of pigment, about 19% by weight of terpolymer and about 5% by weight of surface-active agent.

EXAMPLE 4

(a) An aqueous pigment suspension was prepared from 80 g of β-copper phthalocyanine and 360 g of water with the aid of an Ultra-Turrax. 80 g of the latex from Example 1 were then allowed to run in, whilst the mixing unit continued to run. The pH value was then adjusted to 1 with 10% strength sulphuric acid, without switching off the Ultra-Turrax. The coagulate was filtered off, washed thoroughly with warm water and dried at 50° C. in vacuo. About 100 g of a product consisting of 80% by weight of copper phthalocyanine and 20% by weight of terpolymer were obtained.

(b) 50 g of this pigment concentrate were ground together with 2.5 g of the surface-active agent from Example (2b). A pulverulent pigment concentrate consisting of about 76% by weight of pigment, about 19% by weight of terpolymer and about 5% by weight of surface-active agent was again obtained.

EXAMPLE 5

(a) The procedure followed was as described in Example (3a), but using 70 g of β-copper phthalocyanine and 120 g of the latex from Example 1, whereupon about 100 g of a product consisting of 70% by weight of pigment and 30% by weight of terpolymer were obtained.

(b) 50 g of this pigment concentrate were ground together with 2.5 g of the surface-active agent from Example (2b). A pulverulent pigment concentrate consisting of about 66.5% by weight of pigment, about 28.5% by weight of terpolymer and about 5% by weight of surface-active agent was obtained.

EXAMPLE 6

The 25% strength terpolymer latex from Example 1 was diluted with water to a solids content of about 5%. The pH was then adjusted to 8 by stirring in 10% strength sodium hydroxide solution, whereupon a 5% strength clear solution of the terpolymer in water was obtained.

(a) The procedure followed was as described in Example (3a), but the 80 g of latex were replaced by 400 g of the polymer solution described above. As under (3a), about 100 g of a product consisting of 80% by weight of copper phthalocyanine and 20% by weight of terpolymer was obtained.

(b) 50 g of this pigment concentrate were ground together with 2.5 g of the surface-active agent from Example (2b) to give a pulverulent pigment concentrate consisting of about 76% by weight of pigment, about 19% by weight of terpolymer and about 5% by weight of surface-active agent.

EXAMPLE 7

(a) The procedure followed was as described in Example (4a), but 400 g of the 5% strength polymer solution from Example (6 were employed instead of the latex. About 100 g of a product consisting of 80% by weight of copper phthalocyanine and 20% by weight of terpolymer were obtained.

(b) 50 g of this concentrate were ground together with 2.5 g of the surface-active agent from Example (2b) to give a pulverulent pigment concentrate consisting of about 76% by weight of pigment, about 19% by weight of terpolymer and about 5% by weight of surface-active agent.

EXAMPLE 8

(a) The procedure followed was as described in Example (3a), but a blade stirrer was employed as the mixing unit. 100 g of a homogeneous product consisting of 80% by weight of copper phthalocyanine and 20% by weight of terpolymer were obtained.

(b) The procedure followed was as described in Example (4a), but a propeller stirrer was employed as the mixing unit. The aqueous coagulate suspension was then ground on a laboratory bead mill. The coagulate was then filtered off, washed and dried. About 96 g of a product consisting of 80% by weight of copper phthalocyanine and 20% by weight of terpolymer were obtained.

EXAMPLE 9

80 g of β-copper phthalocyanine and 80 g of water were mixed to a 50% strength paste on a laboratory dissolver in the course of 10 minutes and the paste was then diluted with 160 g of water to give a 25% strength pigment suspension. 80 g of the latex from Example 1 and thereafter 30 g of a 10% strength aluminium sulphate solution were then allowed to run in and the pH was adjusted to 1 with 10% strength sulphuric acid. Only then was the dissolver switched off, and the coagulate was isolated, washed and dried. About 98 g of a product consisting of 80% by weight of pigment and 20% by weight of terpolymer were obtained.

EXAMPLE 10

An approximately 15% strength aqueous pigment suspension was prepared from 80 g of β-copper phthalocyanine and 450 g of water in the course of a few minutes with the aid of a laboratory bead mill. The suspension was transferred to an open vessel which was provided with a blade stirrer. 80 g of the latex from Example 1, then 30 g of a 10% strength aluminium sulphate solution and then 10% strength sulphuric acid, up to pH 1, were allowed to run in, whilst stirring. After switching off the stirrer, the coagulate was isolated, washed and dried. About 97 g of a product were obtained which consisted of copper phthalocyanine to the extent of 80% by weight and terpolymer to the extent of 20% by weight.

EXAMPLE 11

A 25% strength terpolymer latex was prepared from 43 g of butyl acrylate, 37 g of acrylonitrile and 20 g of methacrylic acid according to the process described in Example 1.

(a) The procedure followed for the preparation of a pigment concentrate using this latex was as described in Example (3a). About 100 g of a product consisting of 80% by weight of copper phthalocyanine and 20% by weight of terpolymer were obtained.

(b) 50 g of this pigment concentrate were ground together with 2.5 g of the surface-active agent from Example (2b) to give a pulverulent pigment concentrate consisting of about 76% by weight of pigment, about 19% by weight of terpolymer and about 5% by weight of surface-active agent.

EXAMPLE 12

A 25% strength terpolymer latex was prepared from 43 g of buthyl acrylate, 17 g of styrene and 40 g of methacrylic acid according to the process described in Example 1.

The procedure followed for the preparation of a pigment concentrate using this latex was as described in Example (3a). About 100 g of a product consisting of 80% by weight of copper phthalocyanine and 20% by weight of terpolymer were obtained.

EXAMPLE 13

(a) The procedure followed was as in Example (4a), but 200 g of a 10% strength aqueous solution of an adduct of maleic anhydride and polybutadiene oil (molecular weight about 1,500) were employed instead of the latex. The adduct had an acid number of about 100. The aqueous solution of the resin, which had been neutralised with triethylamine, also contained butanol as a co-solvent. About 100 g of a product consisting of 80% by weight of copper phthalocyanine and 20% by weight of polymer were obtained.

(b) 50 g of this pigment concentrate were ground together with 2.5 g of the surface-active agent from Example (2b) to give a pulverulent pigment concentrate consisting of about 76% by weight of pigment, about 19% by weight of polymer and about 5% by weight of surface-active agent.

EXAMPLE 14

The procedure followed was as described in Example (4a), but 70 g of β-copper phthalocyanine and 300 g of the 10% strength aqueous polymer solution from Example 13 were employed. About 100 g of a product consisting of 70% by weight of pigment and 30% by weight of polymer were obtained.

EXAMPLE 15

(a) The procedure followed was as described in Example (4a), but 200 g of a 10% strength aqueous solution of an isocyanate-modified alkyd resin based on vegetable fatty acids, having an acid number of about 45, were employed instead of the latex. The aqueous solution of the alkyd resin, which had been neutralised with triethylamine, also contained ethylglycol as a co-solvent. About 100 g of a product consisting of 80% by weight of copper phthalocyanine and 20% by weight of alkyd resin were obtained.

(b) 50 g of this pigment concentrate were ground together with 2.5 g of the surface-active agent from Example (2a) to give a pulverulent pigment concentrate consisting of about 76% by weight of pigment, about 19% by weight of alkyd resin and about 5% by weight of surface-active agent.

EXAMPLE 16

The procedure followed was as described in Example (4a), but 70 g of β-copper phthalocyanine and 300 g of the 10% strength aqueous alkyd resin solution from Example (14) were employed. About 100 g of a product consisting of 70% by weight of pigment and 30% by weight of alkyd resin were obtained.

EXAMPLE 17

Preparation of an approximately 37% strength terpolymer latex (terpolymer consisting of 43% of butadiene, 17% of acrylonitrile and 40% of acrylic acid).

159 g of deionised water, 2.5 g of sodium alkylsulphonate ($C_{12}$–$C_{18}$) and 1 g of tert.-dodecylmercaptan were initially introduced into an autoclave. This aqueous phase was flushed with nitrogen, and a monomer mixture consisting of 43% of butadiene, 17% of acrylonitrile and 40% of acrylic acid was then added. The mixture was warmed to 50° C., whilst stirring intensively, and a solution of 0.3 g of potassium peroxydisulphate in 7 g of water and a solution of 0.3 g of sodium pyrosulphite in 4 g of water were added. The mixture is subsequently stirred at 50° C. for about 6 hours and the latex is degassed in vacuo.

The same latex can also be prepared analogously to Example 1 by the "running in" process.

(a) The procedure followed for the preparation of a pigment concentrate with this latex was as described in Example (4a), using 80 g of β-copper phthalocyanine and 54 g of latex. About 100 g of a product consisting of 80% of pigment and 20% of terpolymer were obtained.

(b) 50 g of this pigment concentrate were ground together with 2.5 g of the surface-active agent from Example (2b) to give a pulverulent pigment concentrate consisting of about 76% of pigment, 19% of terpolymer and 5% of surface-active agent.

All the percentage data are in % by weight.

EXAMPLE 18

(a) The procedure followed was as described in Example 1, but 95 g of β-copper phthalocyanine and 25 g of a 20% strength aqueous solution of a partially esterified 1:1 copolymer, which had been neutralised with ammonia, of styrene and maleic anhydride (average molecular weight 2,500, acid number 175) were employed. About 100 g of a product consisting of 95% by weight of pigment and 5% by weight of polymer were obtained.

(b) 50 g of this pigment concentrate were ground together with 2.5 g of the surface-active agent from Example (2b) to give a pulverulent pigment concentrate consisting of about 90% by weight of pigment, about 5% by weight of polymer and about 5% by weight of surface-active agent.

EXAMPLE 19

The procedure followed was as described in Example 1, but 80 g of β-copper phthalocyanine and 100 g of the 20% strength aqueous polymer solution from Example 18 were employed. About 100 g of a product consisting of 80% by weight of pigment and 20% by weight of polymer were obtained.

EXAMPLE 20

(a) The procedure followed was as described in Example (3a), but 100 g of the 20% strength aqueous polymer solution from Example 18 were employed instead of the latex. About 100 g of a product consisting of 80% by weight of copper phthalocyanine and 20% by weight of polymer were obtained.

(b) 50 g of this pigment concentrate were ground together with 2.5 g of the surface-active agent from Example (2b) to give a pulverulent pigment concentrate consisting of about 76% by weight of pigment, about 19% by weight of polymer and about 5% by weight of surface-active agent.

EXAMPLE 21

The procedure followed was as described in Example (4a), but 100 g of the 20% strength aqueous polymer solution from Example 18 were employed instead of the latex. About 100 g of a product consisting of 80% by weight of copper phthalocyanine and 20% by weight of polymer were obtained.

EXAMPLE 22

The 25% strength terpolymer latex described in Example (1) was prepared, with the deviation that 0.5% of tert.-dodecylmercaptan was added to the monomer mixture.

(a) The procedure followed for the preparation of a pigment concentrate using this latex was as described in Example (4a). About 100 g of a product consisting of 80% by weight of copper phthalocyanine and 20% by weight of terpolymer were obtained.

(b) 50 g of this pigment concentrate were ground together with 2.5 g of the surface-active agent from Example (2b) to give a pulverulent pigment concentrate consisting of about 76% by weight of pigment, about 19% by weight of terpolymer and about 5% by weight of surface-active agent.

EXAMPLE 23

The procedure followed was as described in Example (3a), but 178 g of a 45% strength, water-containing β-copper phthalocyanine press cake were employed. About 100 g of a product consisting of 80% by weight of pigment and 20% by weight of terpolymer were obtained.

EXAMPLE 24

(a) The procedure followed was as described in Example (3a), but 80 g of quinacridone pigment (C.I Pigment Red 122) were employed. About 100 g of a product consisting of 80% by weight of quinacridone and 20% by weight of terpolymer were obtained.

(b) 50 g of this pigment concentrate were ground together with 2.5 g of the surface-acti e agent from Example (2b) to give a pulverulent pigment concentrate consisting of about 76% by weight of pigment, about 19% by weight of polymer and about 5% by weight of surface-active agent.

EXAMPLE 25

(a) The procedure followed was as described in Example (3a), but 80 g of an arylamide pigment (C.I. Pigment Yellow 116) were employed. About 100 g of a product consisting of 80% by weight of pigment and 20% by weight of terpolymer were obtained.

(b) 50 g of this pigment concentrate were ground together with 2.5 g of the surface-active agent from Example (2b) to give a pulverulent pigment concentrate consisting of about 76% by weight of pigment, about 19% by weight of polymer and about 5% by weight of surface-active agent.

EXAMPLE 26

(a) The procedure followed was as described in Example (3a), but 80 g of a needle-shaped iron oxide yellow (predominant particle size 0.1×0.7 μm) were employed. About 100 g of a product consisting of 80% by weight of iron oxide yellow and 20% by weight of terpolymer were obtained.

(b) 50 g of this pigment concentrate were ground together with 2.5 g of the surface-active agent from Example (2b) to give a pulverulent pigment concentrate consisting of about 76% by weight of pigment, about 19% by weight of polymer and about 5% by weight of surface-active agent.

EXAMPLE 27

(a) The procedure followed was as described in Example (3a), but 80 g of perchlorinated copper phthalocyanine (C.I. Pigment Green 7, No. 74,260) were employed. After filtering off and washing, about 167 g of a water-moist coagulate press cake (pigment concentrate press cake) containing about 60% of coagulate were obtained.

(b) 50 g of this coagulate press cake were dried at 50° C. in vacuo in the customary manner. About 30 g of a product consisting of 80% by weight of pigment and 20% by weight of terpolymer were obtained.

EXAMPLE 28

Emulsion paint 1.5 g of the pigment prepared according to Example 25b, together with 10 ml of a 5% strength aqueous solution of 2-dimethylaminoethanol, were stirred into 200 g of a commercially available white-pigmented plastic emulsion paint based on PVAC. Even when stirred in manually, the pigment is dispersed and colours the medium. The mixture was stirred for 3, 10 and 30 minutes with a high-speed stirrer, and a sample was removed in each case and applied to a substrate. All 3 samples showed the same depth of colour, measured in accordance with DIN 53,234, that is to say the final depth of colour is reached after a stirring time of 3 minutes. The coatings were free from specks and showed no signs of flocculation or flooding. Subsequent dispersion on an intensive shaking machine based on the method of DIN 53,238 (draft) brought no increase in depth of colour.

EXAMPLE 29

Emulsion paint 1.5 g of the pigment prepared according to Example 21, together with 10 ml of a 5% strength aqueous solution of 2-dimethylaminoethanol, were stirred into 200 g of a commercially available white-pigmented plastic emulsion paint based on PVAC. Even when stirred in manually, the pigment is dispersed and colours the medium. The mixture was stirred for 3, 10 and 30 minutes with a high-speed stirrer, and a sample was removed in each case and applied to a substrate. All 3 samples showed the same depth of colour, measured in accordance with DIN 53,234, that is to say the final depth of colour is reached after a stirring time of 3 minutes. The coatings were free from specks and showed no signs of flocculation or flooding. Subsequent dispersion on an intensive shaking machine based on the method of DIN 53,238 (draft) brought no increase in depth of colour.

EXAMPLE 30

Flexographic printing ink 5.0 g of the pigment prepared according to Example 4b were stirred into 50 g of a flexographic printing ink based on a saponifiable acrylate copolymer, containing about 18% of solids. The printing ink is prepared by dissolving the copolymer in a mixture of ethanol, ethylglycol, water and 2-dimethylaminoethanol. The slight excess of amine usually present is sufficient for dispersing the pigment according to Example 4b.

Before adding the pigment, the printing ink was diluted in the ratio 1:1 with a water/ethanol mixture in order to achieve a suitable stirring consistency. After a stirring time of 15 minutes, the depth of colour was almost completely developed. On subsequent dispersion in an intensive shaking machine, based on the method of DIN 53,238 (draft), no substantial increase in depth of colour could be observed. After adjusting to a printing consistency with water, the ink was used for printing. Proof prints on films and paper showed deep uniform prints which were free from specks.

EXAMPLE 31

Flexographic printing ink 5.0 g of the pigment prepared according to Example 22a were stirred into 50 g of a flexographic printing ink based on a saponifiable acrylate copolymer, containing about 18% of solids. The printing ink is prepared by dissolving the copolymer in a mixture of ethanol, ethylglycol, water and 2-dimethylaminoethanol. The slight excess of amine usually present is sufficient for dispersing the pigment according to Example 22a.

Before adding the pigment, the printing ink was diluted in the ratio 1:1 with a water/ethanol mixture in order to achieve a suitable stirring consistency. After a stirring time of 15 minutes, the depth of colour was almost completely developed. On subsequent dispersion in an intensive shaking machine, based on the method of DIN 53,238 (draft), no substantial increase in depth of colour could be observed. After adjusting to a printing consistency with water, the ink was used for printing. Proff prints on films and paper showed deep uniform prints which were free from specks.

EXAMPLE 32

Pigment printing 15 g of the concentrate, prepared according to Example 3b, of a β-copper phthalocyanine pigment (C.I. Pigment Blue 15, No. 74,160), 150 g of an aqueous dispersion of a copolymer consisting of 69% of butyl acrylate, 20% of acrylonitrile, 5% of N-methylol-methacrylamide and 6% of acrylic acid, 1 g of ammonium sulphate, 824 g of a 70% strength heavy petroleum-in-water emulsion and 10 g of trimethylolmelamine trimethyl ether are mixed. A paste with pseudo-plastic flow properties is formed, which is applied, by the gravure roller printing process, in the form of patterns to textiles made of cotton, viscose staple, polyamide woven fabrics and polyamide knitted fabrics and produces on these textiles a deep, brilliant blue print which, after fixing in hot air at 140° C. for 8 minutes, is resistant to washing at the boil, washing with rubbing and rubbing. The handle of the printed goods is virtually not at all hardened.

The 70% strength heavy petroleum-in-water emulsion is obtained by emulsifying a mixture of 292 g of water and 8 g of a reaction product of 1 mol of cetyl alcohol and 15 mols of ethylene oxide, and 700 g of heavy petroleum with the boiling range from 140° to 200° 1 C. by means of a high-speed stirrer (3,000–6,000 revolutions/minute).

EXAMPLE 33

Pigment printing 33.4 g of the approximately 60% strength water-moist pigment concentrate prepared according to Example 27a are dispersed in a mixture of 86.6 g of water, 5 g of o-benzyloxydiphenyl polyglycol ether and 5 g of triethanolamine using a high-speed stirrer.

120 g of a 40% strength aqueous dispersion of a copolymer consisting of 62% of butyl acrylate, 30% of styrene, 4% of acrylamide and 4% of N-methylolmethacrylamide, 10 g of hexamethylolmelamine hexamethyl ether, 1 g of ammonium sulphate and 759 g of a 70% strength heavy petroleum-in-water emulsion according to Example 1 are mixed with the resulting mixture using a high-speed stirrer.

The mixture is a paste which, by the film printing process or screen printing process, produces a bright, deep green print on cotton, viscose staple and textiles made of polyamide and cotton/polyester. After fixing at 140° C. for 8 to 10 minutes, the print becomes fast in use and fast to washing.

EXAMPLE 34

Pigment printing 20 g of the pulverulent pigment concentrate prepared according to Example 27b are dispersed in a mixture of 100 g of water, 5 g of o-benzyloxydiphenyl polyglycol ether and 5 g of triethanolamine using a high-speed stirrer.

120 g of a 40% strength aqueous dispersion of a copolymer consisting of 62% of butyl acrylate, 30% of styrene, 4% of acrylamide and 4% of N-methylolmethacrylamide, 10 g of hexamethylolmelamine hexamethyl ether, 1 g of ammonium sulphate and 759 g of a 70% strength heavy petroleum-in-water emulsion according to Example 1 are mixed with the resulting mixture using a high-speed stirrer.

The mixture in a paste which, by the film printing process or screen printing process, produces a bright, deep green print on cotton, viscose staple and textiles made of polyamide and cotton/polyester. After fixing at 140° C. for 8 to 10 minutes, the print becomes fast in use and fast to washing.

EXAMPLE 35

Pigment printing 30 g of the concentrate, prepared according to Example 2a, of a β-copper phthalocyanine pigment (C.I. Pigment Blue 15, No. 74,160) are dispersed in a mixture of 100 g of water and 10 g of a reaction product of 1 mol of oleyl alcohol and 15 mols of ethylene oxide, as the emulsifying agent, by means of a high-speed stirrer.

50 g of the dispersion prepared, 150 g of a 40% strength dispersion of an addition product of 218.5 g of the polyester of adipic acid/hexanediol/neopentylglycol (OH number 63), 38 g of 1,6-hexanediisocyanate and the reaction product of 3.76 g of ethylenediamine and 7.63 g of 1,3-propanesultone in 35 ml of 10% strength aqueous potassium hydroxide solution, 10 g of o-benzyloxydiphenyl polyglycol ether, 10 g of trimethylolmelamine trimethyl ether and 780 g of a 70% strength heavy petroleum-in-water emulsion according to Example 1 are mixed using a high-speed stirrer. A printable paste to formed which produces, by the film printing process and screen printing process, a brilliant blue print on cotton and viscose staple as well as polyester/cotton fabrics. After fixing at 150° C. for 5 to 7 minutes, the print becomes fast in use and fast to washing.

EXAMPLE 36

Pigment printing 25 g of the concentrate, prepared according to Example 3a, of a β-copper phthalocyanine pigment (C.I. Pigment Blue 15, No. 74,160) are dispersed in a mixture of 100 g of water, 10 g of o-benzyloxydiphenyl polyglycol ether and 5 g of ammonia by means of a high-speed stirrer. A stable dispersion results, 50 g of which and 120 g of a 40% strength aqueous dispersion of a copolymer consisting of 55% of n-butyl acrylate, 23% of acrylonitrile, 17% of vinyl chloride and 5% of N-methylol methacrylate, 10 g of hexamethylolmelamine hexamethyl ether, 14 g of an ammonium salt of a polyacrylic acid having a molecular weight greater than 100,000 and 806 g of water are mixed by means of a high-speed stirrer.

A paste results which produces, by means of a rotary film printing machine, a bright, deep blue print on cotton, viscose staple and textiles made of polyamide and cotton/polyester. After fixing at 150° C. for 5 minutes, the print becomes fast in use and fast to washing.

We claim:

1. Process for the preparation of a pigment concentrate intimately mixed with polymer containing carboxyl groups comprising coagulating, with electrolytes, an aqueous pigment suspension free from non-ionic surface active agents and containing a latex or solution of said polymer having carboxyl groups while subjecting the pigment suspension to intensive mixing, said pigments of the group of titanium dioxide, chromium oxide and iron oxide, cadmium pigments based on the sulphide and sulphide/selenide, mixed phase pigments of the rutile or spinel type, copper phthalocyanine pigment, quinacridone pigment, diaryl yellow pigment, dioxazine pigment, anthanthrone pigment, thioindigo pigment, naphthalenetetracarboxylic acid pigment, perylenetetracarboxylic acid pigment and an azo pigment of the monazo and disazo series.

2. Process of claim 1 in which the pigment and polymer mixture is separated and dried after coagulation.

* * * * *